(12) United States Patent
Blitzer et al.

(10) Patent No.: US 9,098,804 B1
(45) Date of Patent: Aug. 4, 2015

(54) USING DATA AGGREGATION TO MANAGE A MEMORY FOR AN EVENT-BASED ANALYSIS ENGINE

(71) Applicants: Aharon Blitzer, Shoham (IL); Aviram Katz, Kiryat Onno (IL); Amit Lieberman, Raanana (IL); Amihai Hadar, Herzelia (IL); Senya Touretski, Ramat Gan (IL); Meytal Ashkenazy, Netanya (IL); Radai Rosenblatt, Petah Tikva (IL)

(72) Inventors: Aharon Blitzer, Shoham (IL); Aviram Katz, Kiryat Onno (IL); Amit Lieberman, Raanana (IL); Amihai Hadar, Herzelia (IL); Senya Touretski, Ramat Gan (IL); Meytal Ashkenazy, Netanya (IL); Radai Rosenblatt, Petah Tikva (IL)

(73) Assignee: EMC International Company, Hamilton (BM)

( * ) Notice: Subject to any disclaimer, the term of this patent is extended or adjusted under 35 U.S.C. 154(b) by 213 days.

(21) Appl. No.: 13/727,855

(22) Filed: Dec. 27, 2012

(51) Int. Cl.
*G06N 5/02* (2006.01)

(52) U.S. Cl.
CPC .................................. *G06N 5/02* (2013.01)

(58) Field of Classification Search
CPC ........... G06N 5/02; G06N 5/025; G06N 5/04; G06N 5/022; G06N 99/005; G06F 17/00; G06Q 10/10; G06Q 10/06
See application file for complete search history.

(56) References Cited

U.S. PATENT DOCUMENTS

| | | | |
|---|---|---|---|
| 7,076,685 B2 | 7/2006 | Pillai et al. | |
| 7,409,379 B1 | 8/2008 | Katzer | |
| 7,482,931 B2 | 1/2009 | Lin | |
| 7,606,813 B1 | 10/2009 | Gritsay et al. | |
| 7,613,726 B1 | 11/2009 | Spivak et al. | |
| 7,668,953 B1 | 2/2010 | Sinclair et al. | |
| 7,761,594 B1 | 7/2010 | Mowat | |
| 7,836,427 B1 | 11/2010 | Li et al. | |
| 8,224,761 B1 | 7/2012 | Rockwood | |
| 2004/0093581 A1 | 5/2004 | Nielsen et al. | |
| 2004/0117407 A1* | 6/2004 | Kumar et al. | 707/200 |
| 2004/0250258 A1 | 12/2004 | Raghuvir et al. | |
| 2005/0125688 A1 | 6/2005 | Ogawa et al. | |
| 2005/0246304 A1 | 11/2005 | Knight et al. | |
| 2006/0179028 A1 | 8/2006 | Bram et al. | |
| 2006/0179042 A1 | 8/2006 | Bram et al. | |
| 2006/0179058 A1 | 8/2006 | Bram et al. | |
| 2007/0094199 A1 | 4/2007 | Deshpande et al. | |
| 2007/0260470 A1 | 11/2007 | Bornhoevd et al. | |
| 2008/0196006 A1* | 8/2008 | Bates et al. | 717/109 |
| 2009/0019000 A1* | 1/2009 | Arends et al. | 707/3 |
| 2009/0113387 A1 | 4/2009 | Ziegler | |

(Continued)

OTHER PUBLICATIONS

Tucker D. et al., "Method of processing events for real-time analysis of key processes of an enterprise", patent application AU2010212459, published Mar. 24, 2011.*

(Continued)

*Primary Examiner* — Jeffrey A Gaffin
*Assistant Examiner* — Dave Misir
(74) *Attorney, Agent, or Firm* — Daly, Crowley, Mofford & Durkee, LLP

(57) ABSTRACT

In one aspect, a method includes receiving an original rule configured to be used by an event based analysis engine. The original rule requires data to be collected over a period of time. The method also includes determining if the period of time is greater than a time period threshold; determining if the original rule includes an aggregate function; generating an aggregation rule that aggregates the data to be collected by the original rule if the original rule includes an aggregate function and if the period of time is greater than the time period threshold and aggregating data according to the aggregation rule.

13 Claims, 5 Drawing Sheets

(56) References Cited

U.S. PATENT DOCUMENTS

| | | | |
|---|---|---|---|
| 2009/0150319 A1* | 6/2009 | Matson et al. | 706/47 |
| 2009/0171879 A1* | 7/2009 | Bullen et al. | 706/47 |
| 2009/0287628 A1* | 11/2009 | Indeck et al. | 706/47 |
| 2010/0128676 A1 | 5/2010 | Wu et al. | |
| 2010/0175055 A1 | 7/2010 | Wang et al. | |
| 2010/0198636 A1 | 8/2010 | Choudhary et al. | |
| 2011/0138291 A1 | 6/2011 | Twiddy et al. | |
| 2011/0141913 A1 | 6/2011 | Clemens et al. | |
| 2011/0167433 A1 | 7/2011 | Appelbaum et al. | |
| 2011/0191692 A1 | 8/2011 | Walsh et al. | |
| 2011/0238452 A1 | 9/2011 | Ziade et al. | |
| 2012/0131185 A1* | 5/2012 | Petersen et al. | 709/224 |
| 2012/0291008 A1* | 11/2012 | Bates et al. | 717/106 |
| 2012/0317504 A1 | 12/2012 | Patel et al. | |
| 2013/0132108 A1* | 5/2013 | Solilov et al. | 705/2 |
| 2013/0191185 A1* | 7/2013 | Galvin | 705/7.37 |
| 2014/0165140 A1* | 6/2014 | Singla et al. | 726/1 |

OTHER PUBLICATIONS

Blitzer et al.; "Providing Historical Data to an Event-Based Analysis Engine;" U.S. Appl. No. 13/429,524, filed Mar. 26, 2012; 17 Pages.
Office Action dated Jun. 6, 2014 coresponding to U.S. Appl. No. 13/429,524, 13 Pages.
Response to Office Action dated Jun. 6, 2014 corresponding to U.S. Appl. No. 13/429,524; Response Filed on Oct. 6, 2014, 13 Pages.
Blitzer et al.; "Managing a Memory of an Even-Based Analysis Engine;" U.S. Appl. No. 13/534,481, filed Jun. 27, 2012, 22 Pages.
Office Action dated Jul. 17, 2014 corresponding to U.S. Appl. No. 13/534,481, 10 Pages.
Blitzer et al.; "Simplifying Rules Generation for an Even-Based Analysis Engine by Allowing a User to Combine Related Objects in a Rule;" U.S. Appl. No. 13/533,159, filed Jun. 26, 2012; 29 Pages.
Office Action dated Feb. 13, 2014 corresponding to U.S. Appl. No. 13/533,159, 14 Pages.
Response to Office Action dated Feb. 13, 2014 corresponding to U.S. Appl. No. 13/533,159; Response Filed on Aug. 13, 2014, 12 Pages.
Blitzer et al.; "Simplifying Rules Generation for an Event-Based Analysis Engine;" U.S. Appl. No. 13/534,488, filed Jun. 27, 2012; 30 Pages.
Office Action dated Jan. 31, 2014 corresponding to U.S. Appl. No. 13/534,488, 23 Pages.
Response to Office Action dated Jan. 31, 2014 corresponding to U.S. Appl. No. 13/534,488; Response Filed on Jul. 30, 2014, 13 Pages.
Office Action dated Nov. 6, 2014 corresponding to U.S. Appl. No. 13/429,524; 23 Pages.
Final Office Action dated Mar. 26, 2015 corresponding to U.S. Appl. No. 13/534,488; 25 Pages.
Response to Office Action dated Jul. 17, 2014 corresponding to U.S. Appl. No. 13/534,481; Response Filed on Oct. 20, 2014; 11 Pages.
Final Office Action dated Sep. 24, 2014 corresponding to U.S. Appl. No. 13/533,159; 22 Pages.
Office Action dated Apr. 30, 2015; for U.S. Appl. No. 13/429,524; 37 pages.

\* cited by examiner

USING DATA AGGREGATION TO MANAGE A MEMORY FOR AN EVENT-BASED ANALYSIS ENGINE

BACKGROUND

An event-based analysis engine reacts to one or more events. For example, if an event occurs, the event-based analysis engine performs an action based on a rule. In one particular example, the event may be based on historical information.

SUMMARY

In one aspect, a method includes receiving an original rule configured to be used by an event based analysis engine. The original rule requires data to be collected over a period of time. The method also includes determining if the period of time is greater than a time period threshold; determining if the original rule includes an aggregate function; generating an aggregation rule that aggregates the data to be collected by the original rule if the original rule includes an aggregate function and if the period of time is greater than the time period threshold and aggregating data according to the aggregation rule.

In another aspect, an apparatus includes electronic hardware circuitry configured to receive an original rule configured to be used by an event based analysis engine. The original rule requires data to be collected over a period of time. The circuitry is also configured to determine if the period of time is greater than a time period threshold, determine if the original rule includes an aggregate function, generate an aggregation rule that aggregates the data to be collected by the original rule if the original rule includes an aggregate function and if the period of time is greater than the time period threshold and aggregate data according to the aggregation rule.

In a further aspect, an article includes a non-transitory computer-readable medium that stores computer-executable instructions. The instructions cause a machine to receive an original rule configured to be used by an event based analysis engine, the original rule requiring data to be collected over a period of time, determine if the period of time is greater than a time period threshold, determine if the original rule includes an aggregate function, generate an aggregation rule that aggregates the data to be collected by the original rule if the original rule includes an aggregate function and if the period of time is greater than the time period threshold; and aggregate data according to the aggregation rule.

DETAILED DESCRIPTION

Information Technology (IT) environments include a large number of network, computer, storage and backup equipment, which generate a high number of events in a short period of time. An event-based analysis engine that analyzes these events needs to be able to handle many events and to validate many rules efficiently. To do so the event-based analysis engine is required to keep the rules, facts (objects) and the events in memory so it will be able to evaluate every event quickly. In a very large environment this method consumes a lot of memory thereby generating scalability issues.

Described herein are techniques to handle large amount of data in a system that includes an event based analysis engine. In particular, an original rule (e.g., a rule generated by a user) is translated in to an aggregation rule (e.g., an aggregation rule transparent to the user). In one example, the data is aggregated based on a time window of an original rule.

As used herein an entity is a component in the environment that is monitored. An event is a process or metric of the component that is retrieved. For example, an entity is a host, backup client, CPU, storage device and so forth. An event, for example, may be a backup job, CPU utilization and so forth. A rule includes at least one entity, zero or more event(s), a condition and a time window (or timestamp) to measure the entity.

Figure 1:
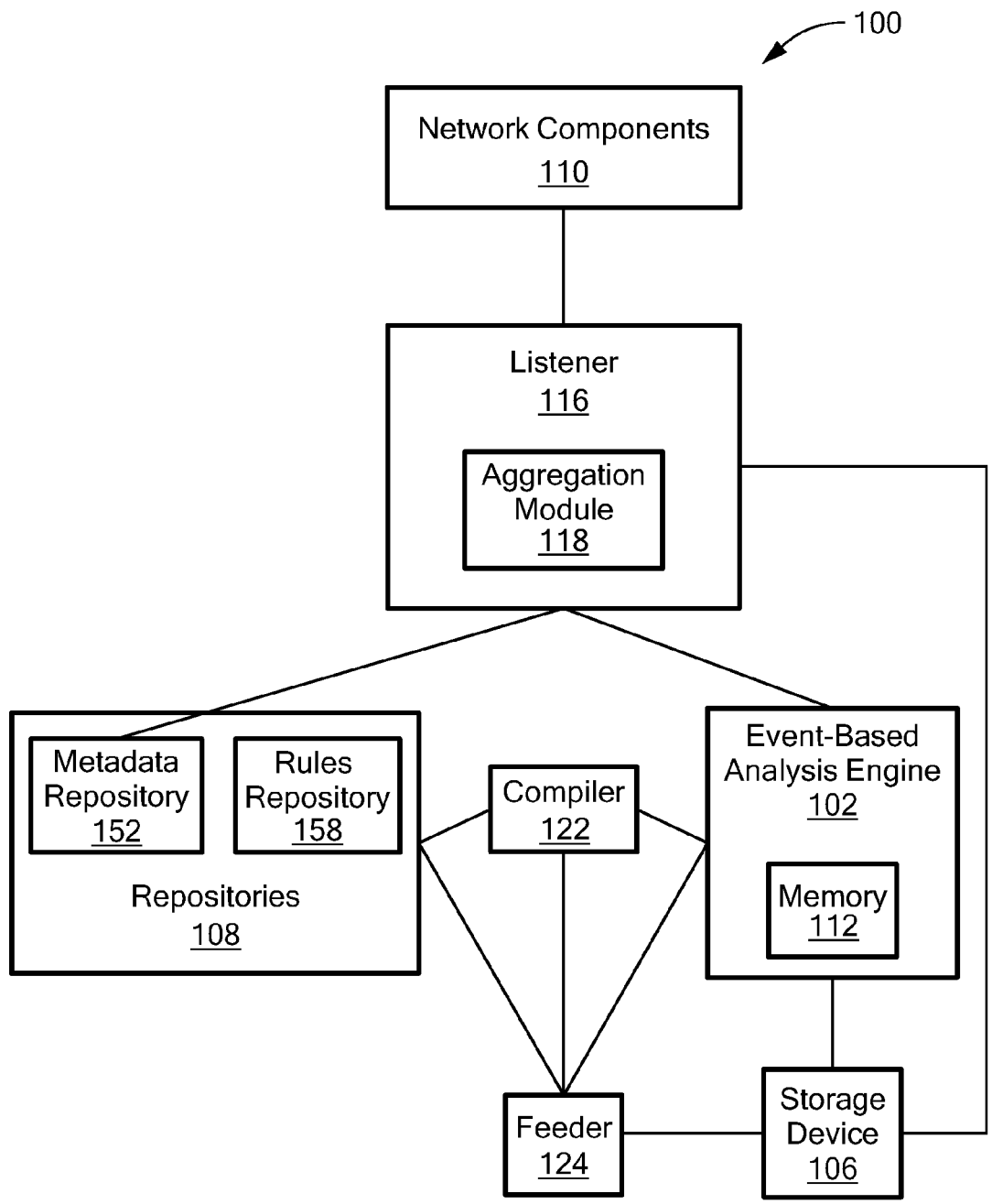
FIG. 1 is a block diagram of an example of a system that includes an event-based analysis engine.

Referring to FIG. 1, a system 100 includes an event-based analysis engine 102, a storage device 106, repositories 108, network components 110, a listener 116 a compiler 122 and a feeder 124. The event-based analysis engine 102 receives the events generated by the network components 110 and processes rules for the events received (e.g., determines an appropriate rule to apply to each event and determines if the rule has been met). In one example, the network components 110 include one or more of hosts, storage arrays, switches (e.g., a fibre channel switch), data protection appliances, applications and so forth.

The listener 116 receives the events and dispatches the event to the storage device 106 and/or to the analysis engine 102 and when required it activates the aggregation process. In particular, the listener 116 receives events from the network components 110 for events based on the rules. The listener 116 includes an aggregation module 118 which aggregates the data. The aggregation module 118 aggregates the data based on an aggregation rule that exists in the metadata, determined by the compiler and loaded into the event-based analysis engine 102.

The event-based analysis engine 102 includes a memory 112. In one example, the rules that have been used within a predetermined time period remain stored in the memory 112 while rules that have not been used in the predetermined time period are moved to the storage device 106. When data arrives into the listener 116, if the event received relates to an active rule (e.g., a rule in use and data is being collect for) which is an aggregation rule, the aggregation module 118 will modify the aggregated information (e.g., average, maximum, minimum, summation, count and so forth) and will send the event to the storage device 106 and the aggregated information to the storage device 106 and to the event-based analysis engine 102 and a summarized entity will be inserted in the memory 112. For example, if the backup jobs are taken on an hourly basis over several months and if the user has created a rule that checks the average of the backup-job backup size over a period of time like a month, instead of saving all the backup job data done during the rule time period (month) the backup job data is summarized at an aggregation level that is daily for an aggregation rule thereby reducing the amount of data to keep in memory 112.

The repositories 108 describe definitions of different domain objects and additionally describe the relationship between the different domain objects and between the objects and their components in the same domain. As used herein, a domain is a collection of objects in a particular environment. For example, the environment can be a continuous data protection environment and the objects can be data protection appliances, hosts, storage arrays, applications and so forth.

The repositories 108 include a metadata repository 152 and a rules repository 158. The rules repository 158 stores the rules in a rules repository format. For example, the rules repository 158 stores the rules generated by the user that will be used by the event-based analysis engine 102. Additionally, the metadata repository 152 will include the aggregation rules.

The metadata repository 152 stores metadata on each event. The metadata includes the information about the attributes of an entity or of an event. In one example, the metadata for each event is used to determine the size of the data in order to perform data aggregation. The metadata repository 152 also stores object types, object hierarchy and the relationships of the objects to each other in an object repository format. In particular, an object is part of an object type and each object is related to one or more other objects. Each object also has one or more attributes. Any attribute of an object that is monitored and is not part of the object is stored. For example, every "Host" object has its Internet Protocol (IP) attribute that may contain multiple values. The metadata repository 152 also stores a relationship of an object to its attributes and components (Object Extension) and a relationship between an object to its related cross-domain objects (context).

The repositories 108 collect information from multiple data-sources/domains and are able to validate rules that are (1) from the same domain because the relationship between the objects is retrieved from the data-source/domains and (2) from multiple domains in case the user defines the relationship of the objects from different data-sources/domains.

The compiler 122 compiles the rules repository format into a format compatible with the event-based analysis engine rules 102. The compiler also identifies rules that include an aggregate function (e.g., average, maximum, minimum, summation, count and so forth) and converts those rules in to an aggregation rule. In one example, the aggregation rule is used internally by the system 100 and is transparent to a user that generated the rule. At compile time, an aggregation level is determined (e.g., hourly, daily, weekly and so forth) by the compiler 122 according to the time window. The aggregation rule is stored in the rule repository 158 and loaded in to the event-based analysis engine 102. The feeder 124 and the listener 116 are notified that a new rule is activated.

The feeder 124 queries the storage device 106 to retrieve the historical data and provides the historical information to the event-based engine 102. In one example, the feeder 124 fetches relevant data over a time window of an aggregation rule and inserts the fetched data into the analysis engine 102. In particular, the feeder 124 will group the entities according to the aggregation level and fetches the data from the storage device 106. In one example, the listener 116 is configured to aggregate data at the aggregation level and stores the aggregated data at the storage device 106, which stores the event and the calculated values.

In another example, for those rules that are not aggregation rules the feeder 124 fetches all the events in a time window of each rule.

Figure 2:
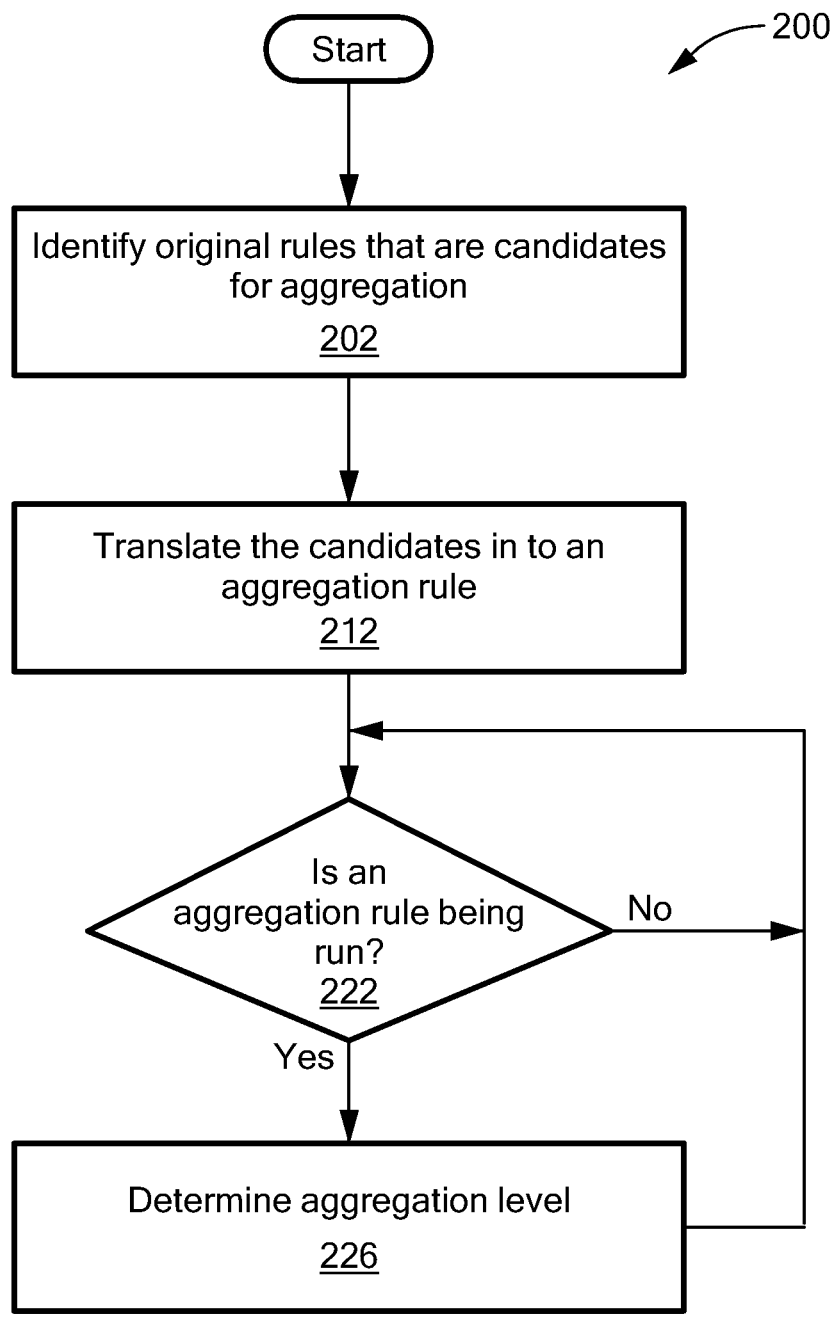
FIG. 2 is a flowchart of an example of a process to generate aggregation rules.

Referring to FIG. 2, an example of a process to generate aggregation rules is a process 200. Process 200 identifies original rules that are candidates for aggregation (202). For example, the compiler 122 evaluates an original rule and determines if there is an aggregate function within the original rule. In another example, the compiler 122 evaluates an original rule and determines if there is an aggregate function within the original rule and determines if the time window is greater than a time period threshold by, for example, reading metadata for the events associated with the original rule. In a further example, the compiler 122 determines if the rule will require data over a particular time (time window), which will cause a data size to be larger than a predetermined value.

Process 200 translates candidates in to an aggregation rule (212). For example, the compiler 122 translates the original rule in to an aggregation rule. In one particular example, the original rule is renamed to include an identifier. For example, an original rule labeled "BackupJob" is renamed "Aggegate-BackupJob". The aggregation rule is transparent to the user. Internally the event-based analysis engine 102 uses the aggregation rule, which generate the same result as the original rule.

Process 200 determines if there are any aggregation rules being run (222). If there are any aggregation rules being run, process 200 determines the aggregation level. For example, if the time window for the original rule is greater than 3 hours but less than 3 days, the aggregate level is hourly. If the time period for the original rule is greater than three days, the aggregation level is daily.

Figure 3:
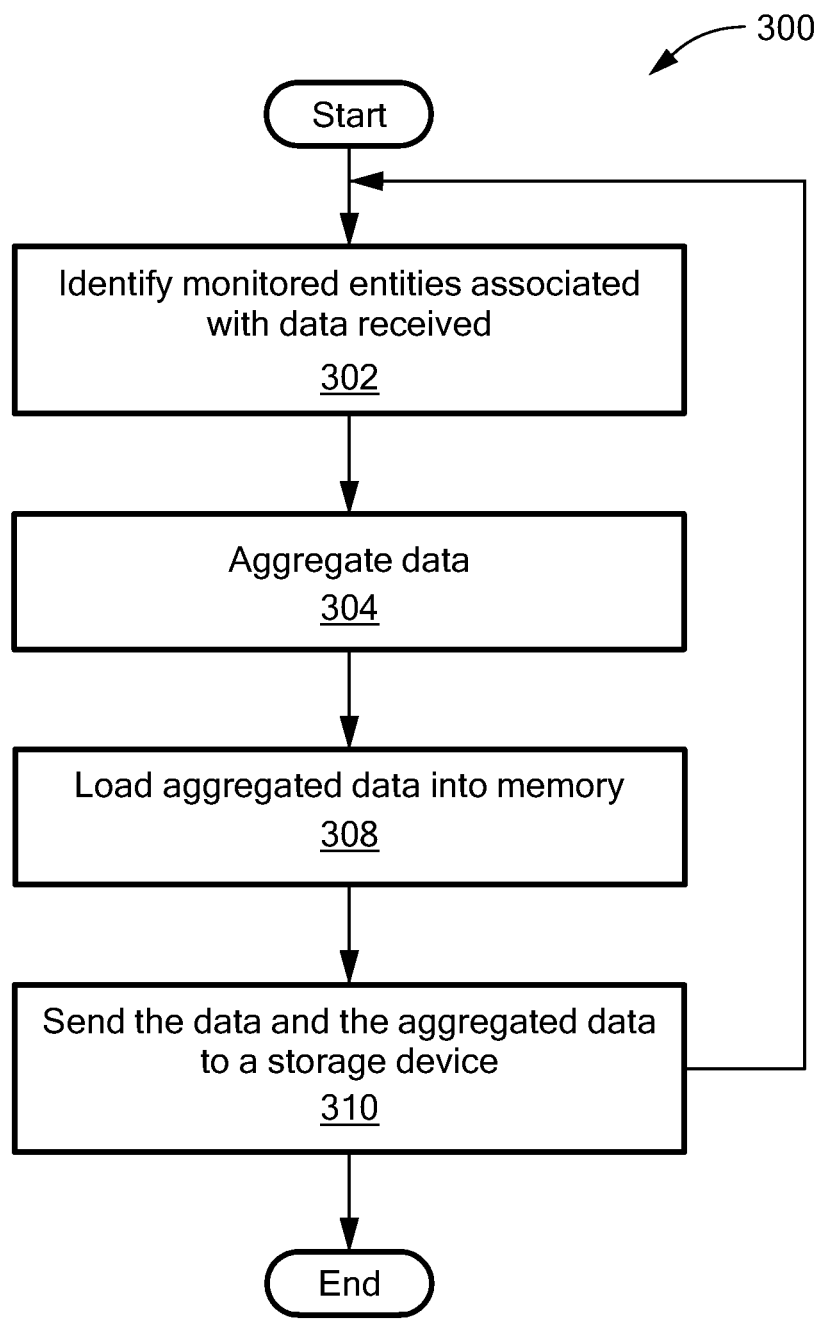
FIG. 3 is a flowchart of an example of a process to generate aggregated data.

Referring to FIG. 3, an example of a process to generate aggregated data is a process 300. Process 300 identifies monitored entities associated with data received (302). For example, the listener 116 identifies monitored entities associated with data received. Process 300 aggregates the data (304). For example, for those entities for which an aggregation rule exists, the aggregation module 118 aggregates the data. Process 300 loads the aggregated data into memory (308) and sends the data and the aggregated data to the storage device (310). For example, the aggregation module 118 loads the aggregated data into the memory 112 and sends the data and the aggregated data to the storage device 106.

Figure 4:
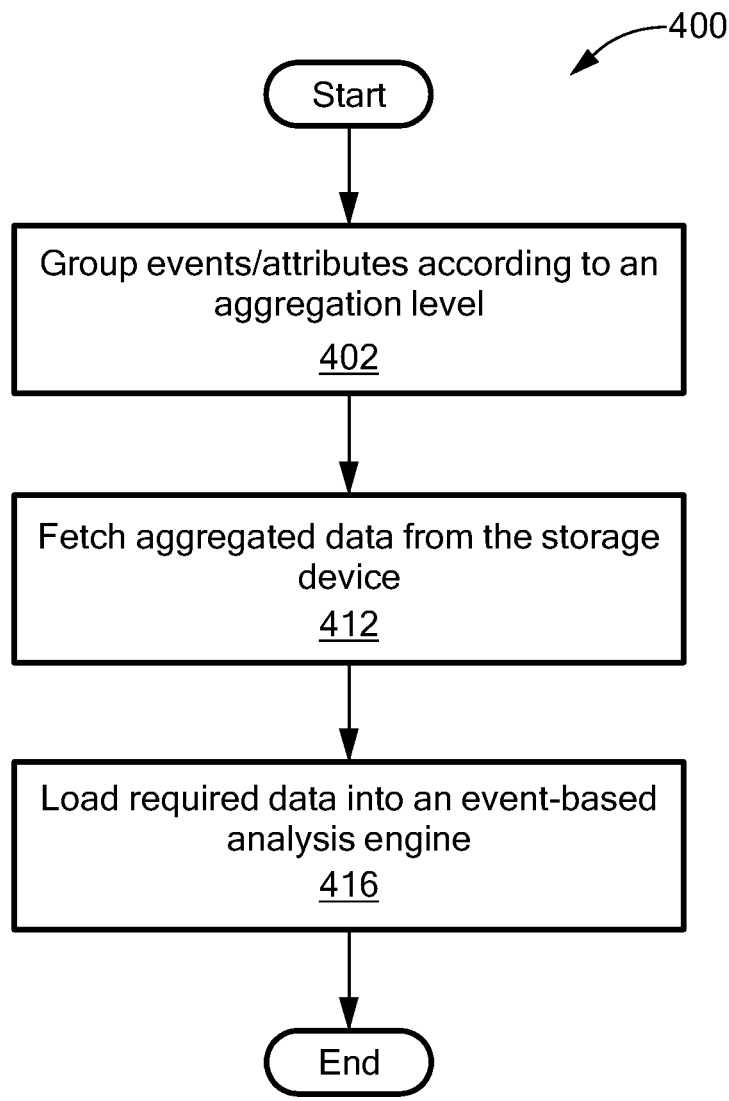
FIG. 4 is a flowchart of an example of a process to aggregate historical data.

Referring to FIG. 4, an example of a process to aggregate historical data is a process 400. In one example, process 400 is performed when an aggregation rule is activated. In another example, process 400 is performed when the event-based analysis engine 102 is restarted.

Process 400 groups events/attributes according to an aggregation level (402). For example, the feeder 124 groups the entity according to the aggregation level. Process 400 fetches the aggregated data from the storage device 106 (412). For example, the feeder 124 instructs the storage device 106 to perform the aggregated function and fetches the aggregated data. The raw data is retrieved from the storage device 106 and the aggregated data is stored in the storage device 106. Process 400 loads the required data in to the event-based analysis engine 102 (416). For example, the feeder 124 loads the required data at the event-based analysis engine 106. The required data refers to data required by a rule.

Figure 5:
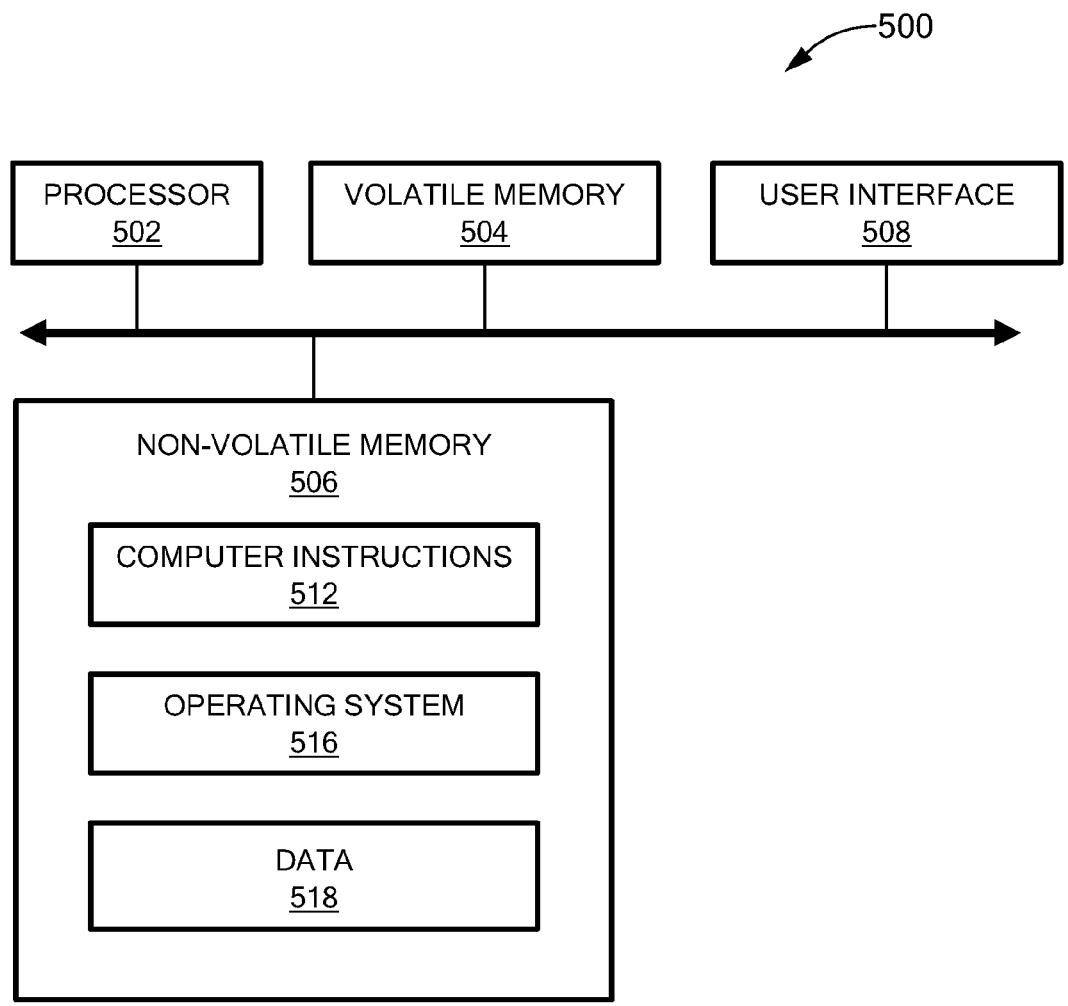
FIG. 5 is a block diagram of a computer on which any of the processes of FIGS. 2, 3 and 4 may be implemented.

Referring to FIG. 5, a computer 500 includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 200, 300 and 400).

The processes described herein (e.g., processes 200, 300 and 400) are not limited to use with the hardware and software of FIG. 5; they may find applicability in any computing or processing environment and with any type of machine or set of machines that is capable of running a computer program.

The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory compute-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300 and 400 are not limited to the specific processing order of FIGS. 2 to 4, respectively. Rather, any of the processing blocks of FIGS. 2 to 4 may be re-ordered, combined or removed, performed in parallel or in serial, as necessary, to achieve the results set forth above.

The processing blocks (for example, in the processes 200, 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:

1. A method comprising:
receiving an original rule configured to be used by an event based analysis engine, the original rule requiring data to be collected over a period of time;
determining if the period of time is greater than a time period threshold;
determining if the original rule includes an aggregate function;
generating an aggregation rule that aggregates the data to be collected by the original rule if the original rule includes an aggregate function and if the period of time is greater than the time period threshold;
aggregating data according to the aggregation rule; and
determining if a size of data to be collected over the period of time is greater than a size threshold comprises evaluating metadata of events associated with the original rule,
wherein generating the aggregation rule comprises generating an aggregation rule that aggregates the data to be collected by the original rule if the original rule includes an aggregate function, if the period of time is greater than the time period threshold and if the size of the data to be collected over the period of time is greater than a size threshold.

2. The method of claim 1 wherein aggregating the data according to the aggregation rule comprises aggregating data previously collected.

3. The method of claim 2 wherein aggregating the data previously collected according to the aggregation rule comprises aggregating data previously collected if the aggregation rule is activated.

4. The method of claim 1 wherein aggregating the data according to the aggregation rule comprises aggregating data based on an aggregation level.

5. An apparatus, comprising:
electronic hardware circuitry configured to:
receive an original rule configured to be used by an event based analysis engine, the original rule requiring data to be collected over a period of time;
determine if the period of time is greater than a time period threshold;
determine if the original rule includes an aggregate function;
generate an aggregation rule that aggregates the data to be collected by the original rule if the original rule includes an aggregate function and if the period of time is greater than the time period threshold;
aggregate data according to the aggregation rule; and
determine if a size of data to be collected over the period of time is greater than a size threshold comprises evaluating metadata of events associated with the original rule,
wherein the circuitry configured to generate the aggregation rule comprises circuitry configured to generate an aggregation rule that aggregates the data to be collected by the original rule if the original rule includes an aggregate function, if the period of time is greater than the time period threshold and if the size of the data to be collected over the period of time is greater than a size threshold.

6. The apparatus of claim 5 wherein the circuitry comprises at least one of a processor, a memory, a programmable logic device and a logic gate.

7. The apparatus of claim 5 wherein the circuitry configured to aggregate the data according to the aggregation rule comprises circuitry configured to aggregate data previously collected.

8. The apparatus of claim 7 wherein the circuitry configured to aggregate the data previously collected according to the aggregation rule comprises circuitry configured to aggregate data previously collected if the aggregation rule is activated.

9. The apparatus of claim 5 wherein the circuitry configured to aggregate the data according to the aggregation rule comprises circuitry configured to aggregate data based on an aggregation level.

10. An article comprising:
a non-transitory computer-readable medium that stores computer-executable instructions, the instructions causing a machine to:
receive an original rule configured to be used by an event based analysis engine, the original rule requiring data to be collected over a period of time;
determine if the period of time is greater than a time period threshold;
determine if the original rule includes an aggregate function;
generate an aggregation rule that aggregates the data to be collected by the original rule if the original rule includes an aggregate function and if the period of time is greater than the time period threshold;
aggregate data according to the aggregation rule; and
determine if a size of data to be collected over the period of time is greater than a size threshold comprises evaluating metadata of events associated with the original rule,
wherein the instructions causing the machine to generate the aggregation rule comprises instructions causing the machine to generate an aggregation rule that aggregates the data to be collected by the original rule if the original rule includes an aggregate function, if the period of time is greater than the time period threshold and if the size of the data to be collected over the period of time is greater than a size threshold.

11. The article of claim 10 wherein the instructions causing a machine to aggregate the data according to the aggregation rule comprises instructions causing a machine to aggregate data previously collected.

12. The article of claim 11 wherein the instructions causing a machine to aggregate the data previously collected according to the aggregation rule comprises instructions causing a machine to aggregate data previously collected if the aggregation rule is activated.

13. The article of claim 10 wherein the instructions causing a machine to aggregate the data according to the aggregation rule comprises instructions causing a machine to aggregate data based on an aggregation level.

* * * * *